March 20, 1945.  CARL-ERIK GRANQVIST  2,371,988
DISTANCE MEASURING DEVICE
Filed Aug. 28, 1941   2 Sheets-Sheet 1

INVENTOR
Carl-Erik Granqvist
BY
his ATTORNEY

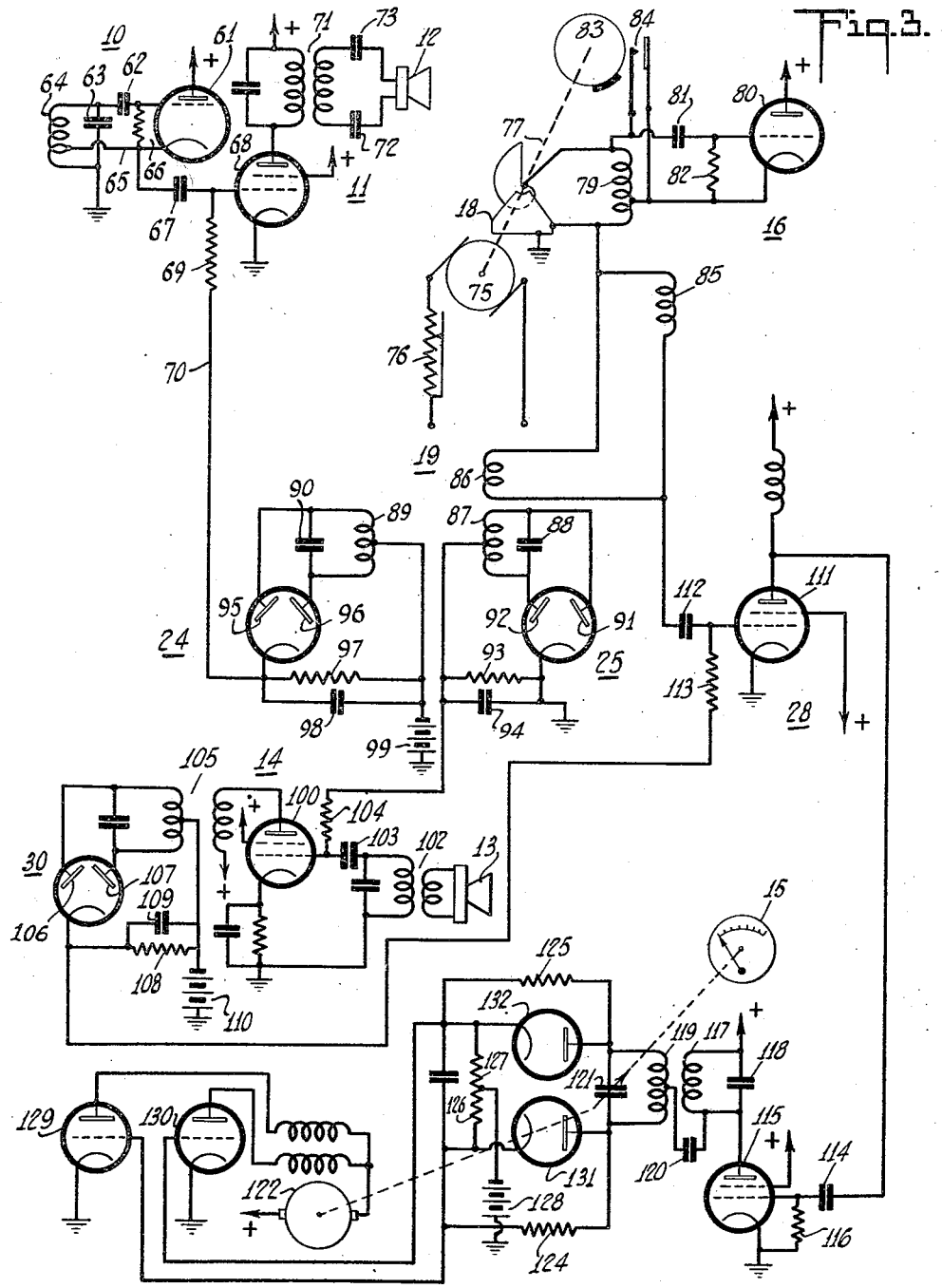

Patented Mar. 20, 1945

2,371,988

UNITED STATES PATENT OFFICE 2,371,988

DISTANCE MEASURING DEVICE

Carl-Erik Granqvist, Stockholm, Sweden, assignor to Aga-Baltic Aktiebolag, Stockholm, Sweden, a corporation of Sweden Application August 28, 1941, Serial No. 408,632
In Sweden October 1, 1940

11 Claims. (Cl. 177—352)

My invention relates to a distance measuring device, and more particularly to a device for measuring depth or height, which may be used in mediums, such as water and air. It is characterized by high precision and speed of operation and may be made to produce a continuous indication of the distance directly on an instrument without calculating operations.

The invention will be described below in connection with the annexed drawings, in which Fig. 1 is a block diagram showing the principle of the invention;

Fig. 3 is a schematic diagram showing one embodiment of the invention; and

Figure 1:
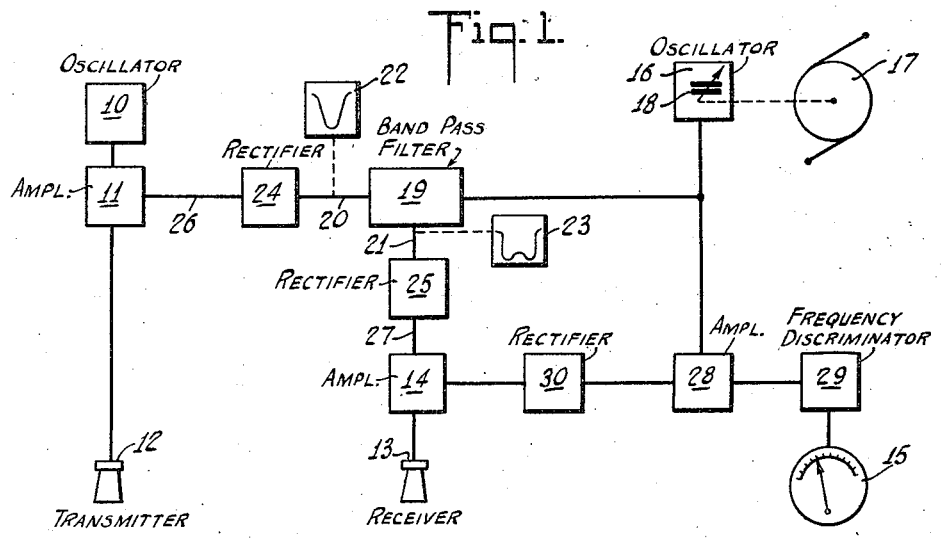

In Fig. 1 10 indicates an oscillator for a preferably ultrasonic frequency, which is to be used for the measurement. The frequency created by the oscillator 10 is intermittently amplified in the amplifier 11 and is transmitted by the transmitter 12.

For receiving the wave, intermittently transmitted from the transmitter 12, after its reflection, a receiver 13 is provided, which is in its turn connected to the amplifier 14. The amplifier 14 is arranged to control an instrument 15 in such a way, that an indication of the measured distance is obtained.

Both of the amplifiers 11 and 14 are controlled by an arrangement for determining their times of operation comprising an oscillator 16 producing a variable frequency which is controlled by a tunning condenser 18 having a rotor driven by a continuously rotating motor 17. The output side of the oscillator 16 is connected to a filter 19, preferably of the band pass. The signal wave generated by the oscillator 16 is tapped off in two different places with different frequency ranges, viz. by means of the conductor 20 from a point with sharp frequency selectivity and also by means of the conductor 21 from a point passing a broader frequency range, as is indicated by means of the schematic indications of frequency selectivity 22 and 23. The conductors 20 and 21 lead each to one rectifier 24 and 25, respectively, the output voltages of which are fed over conductors 26 and 27, respectively, to the amplifiers 11 and 14, respectively, as blocking voltages, being applied in such a way that the amplifier 11 is blocked excepting during the times when the filter 19 transmits the signal from the oscillator 16, whereas on the other hand the amplifier 14 is blocked during the time when the signal from the oscillator 16 reaches the amplifier.

Due to the different band selectivity at the points of the filter to which the conductors 20 and 21 are connected, the blocking interval of the amplifier 14 will be somewhat greater than the interval free from blocking, of the amplifier 11.

The oscillator 16 also is connected to an amplifier 28, which applies a voltage to a frequency sensitive discriminator 29, the output side of which is connected to the measuring instrument 15. The amplifier 28 normally is blocked, but this blocking is intermittently cancelled due to the voltage derived from a rectifier 30 when a signal is entering the receiver 13.

Figure 2:
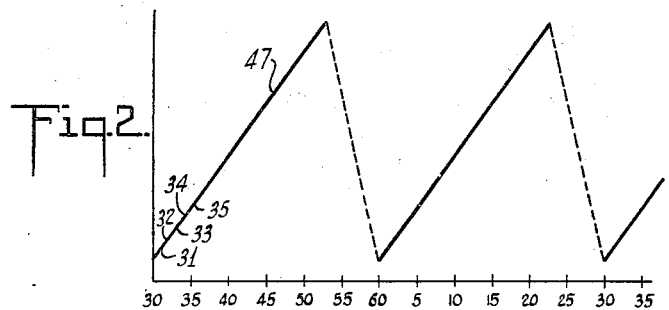
Fig. 2 is a time diagram for explanation of this principle.

The function of the arrangement is stated in a time diagram in Fig. 2, in which the time is marked out along the horizontal axis and the frequency of the oscillator 16 along the vertical axis.

Due to the rotation of the condenser 18 the frequency of the oscillator 16 will periodically pass through predetermined cycles of frequency, as indicated in Fig. 2. It is of no importance to the principle of this invention, whether these curves have rising or falling characteristics, nor is the shape of the time-frequency curve of importance. It is assumed, for purposes of explanation, that this curve is rising and linear, and that its periodicity is for instance ½ min., as indicated by the scale along the horizontal axis, divided in seconds.

The filter 19 is tuned to a frequency corresponding for instance to that at the point 33. Due to the different selectivity at the points in the filter, where the conductors 20 and 21 are tapped off, the amplifier 14 is blocked between the points 31 and 35 and the amplifier 11 is unblocked between the points 32 and 34.

Consequently a pulse of the ultrasonic frequency from the oscillator 10 is transmitted from the transmitter 12 during the period corresponding to the interval from point 32 until the amplifier 11 is blocked again at the point of time 34. One second later the blocking of the amplifier 14 is cancelled at the point 35.

The receiver 13 is provided for receiving the pulse thus transmitted after its reflection from the surface to which the distance is to be measured. By choosing the points of time for the blocking of the amplifiers 11 and 14 as mentioned above the signal received by the receiver 13 during transmission of a pulse from the transmitter 12, the said signal consequently being assumed to be direct instead of reflected, is not amplified. Hence no erroneous registration of this signal takes place.

The signal of the fixed frequency of the oscillator 10 is transmitted from the transmitter 12 to the bottom of the sea or the ground surface, where reflection takes place, whereafter the pulse returns and is received by the receiver 13 at a time, which may for instance correspond to the point 47. The signal is amplified in the amplifier 14 and rectified in the rectifier 30, whereupon the direct current voltage obtained in said rectifier is supplied to the amplifier 28 in such a way that the blocking of this amplifier is cancelled. The alternating current from the oscillator 16 then will be transmitted through the discriminator 29 to the instrument 15 which thus registers the frequency of the oscillator 16 at the moment of the reflected pulse entering the receiver 13.

From the above it will be evident, that the interval of time between the points 32 and 47 will correspond exactly to the time required for the transmitted pulse to pass to the reflection level and back. The frequency in the point 47 therefore will correspond to the distance to the reflection level, and consequently this distance can be plotted on the scale of the instrument 15.

The instrument 15 is assumed to have no restoring force for its pointer, and therefore this will remain fixed on the position which it has registered until the next pulse affects the adjustment of the position of the pointer. The instrument therefore will continuously indicate height or depth as the case may be.

Fig. 3 shows a practical embodiment of the invention.

The oscillator 10 consists of an electronic valve 61 of triodic type. The anode in the valve is connected to the plus terminal of the source of voltage, whereas the grid is connected by means of a condenser 62 to the high voltage terminal with respect to alternating currents of an oscillating circuit, which contains the condenser 63 and the coil 64. The low potential terminal of this circuit is connected to ground, whereas a tap 65 is connected to the cathode. The grid, finally, is connected to the cathode over a grid leak 66.

The tap 65 is connected through a condenser 67 to the control grid of electronic valve 68, contained in the amplifier 11, said electronic valve 68 preferably being of screen grid type. In order to control the blocking of the amplifier the grid of the valve 68 is connected by means of a resistor 69 to the conductor 70, corresponding to the conductor 26 in Fig. 1. The anode circuit of the valve 68, finally, is connected by means of the primary winding of a transformer 71, tuned to the frequency of the oscillator 10, to the plus terminal of the mains, and the secondary winding of the transformer 71 is connected by means of coupling condensers 72 and 73 to the transmitter 12.

The motor 17 is represented in Fig. 3 at 75. It is fed with current from the mains over a control resistor 76 to make it possible to run the motor at different speeds. The shaft 77 of the motor 75 drives the tuning condenser 18 in the oscillator 16. The condenser 18 is constructed with small angular extension of its stator part and great angular extension of its rotor part or possibly vice versa, so that the movement of the condenser from the value of capacity corresponding to minimum frequency, to the value of capacity corresponding to maximum frequency, or possibly vice versa, requires a relatively great part of a revolution of the condenser, whereas the release to the initial position requires a substantially smaller part of the revolution.

In Fig. 2 the curve for variation of frequency extends over ¾ of a period of movement, whereas the movement of release only requires ¼ of the period of movement. Corresponding thereto the stator part of the condenser in Fig. 3 only extends over 90°, whereas the rotor part extends over 270°.

The condenser 18 is connected in parallel to a coil 79, the high voltage terminal of which with respect to alternating currents is connected to the grid of an oscillator valve 80 through a condenser 81. The valve 80 is provided with a grid leak 82. A tap on the coil 79 is connected to the cathode of the valve 80.

Finally, the oscillator is arranged to be made ineffective during the periods of release and return to the position of minimum frequency, for which purpose a cam disc 83 is arranged on the shaft 77 in such an angular position, that it opens and closes a contact 84 at the respective end positions of the release period.

The oscillator voltage is fed to the different parts shown in Fig. 1, over a coupling coil 85, which is inductively coupled to the tuning coil 79. Thus a coil 86 is connected to the coil 85, said coil 86 in turn being inductively connected to a primary coil 87 in the filter 19. The coil 87 is connected in parallel to a condenser 88 for tuning the filter to the frequency which is to be transmitted and further it is inductively coupled to a secondary coil 89 which is tuned by means of the parallel condenser 90. The primary circuit, where the selectivity is less, is provided with a mid point tap which is connected to the cathodes of two rectifiers 91 and 92, the anodes of which are connected to each end of the primary winding. The cathodes work on a common load resistor 93, shunted for alternating currents by means of a condenser 94. In a similar manner the secondary circuit is connected to two rectifiers 95 and 96 over a load resistor 97, which is shunted for alternating current by means of a condenser 98.

The load resistor 97 is connected in series with a source of voltage 99 in the grid bias conductor 70 of the electronic valve 68. The magnitude of the source of bias 99 is so chosen, that the electronic valve 68 is normally blocked. This voltage is opposed, however, by the voltage drop over load resistor 97, when a signal is transmitted over the filter 87—88—89—90, whereby a signal is momentarily transmitted from the oscillator 10 over the amplifier 11 and the transmitter 12 (see Fig. 1).

The load resistor 93 is connected in opposite direction to the load resistor 97. When a signal is transmitted through the filter 87—88—89—90, an electronic valve 100 will therefore momentarily be blocked. This electronic valve is connected to be fed with the signals which may be received by a receiver 13. The signals are transferred by means of the transformer 102 to the grid circuit of the electronic valve 100, which contains the grid condenser 103 and the grid leak 104, this last named being connected to the negative terminal of the load resistor 93.

The electronic valve 100 is connected through the transformer 105 to the rectifiers 106 and 107, which work in the same manner as the earlier described rectifiers and create a blocking voltage in the load resistor 108, which is shunted for alternating current by the condenser 109.

The load resistor 108 is connected in series with the source of voltage 110 to the grid conductor of an electronic valve 111, the source of bias being polarized in such a way that the electronic valve 111 is normally blocked, the blocking bias being opposed, when a signal is received in the receiver 13. The grid of the valve 111 is connected with respect to alternating currents to the coil 85 over a grid condenser 112 and is provided with a grid lead 113. The output conductor of the electronic valve 111 is connected by means of a condenser 114 to a grid of an electronic valve 115, contained in the discriminator 29, said grid being provided with a grid leak 116. The output circuit of this electronic valve 115, finally, is connected to a tuning circuit containing a broadly tuned primary circuit comprising the coil 117 and the condenser 118. The coil 117 is connected in two different ways to the secondary coil 119, viz. inductively as well as by means of a condenser 120, which is connected between the high voltage terminal with respect to alternating current of the coil 117, on the one side, and the mid point of the coil 119, on the other side. The last named secondary coil, finally, is tuned by means of a variable condenser 121, the shaft of which is driven by the differential motor 122 and controls in its turn the pointer of the instrument 15.

The two ends of the secondary side 119 are connected through parallel resistors 124 and 125 and series resistors 126 and 127 to rectifiers 131 and 132, respectively. The junction point of the resistors 126 and 127 is connected to ground by means of a bias battery 128, whereas the ends of the resistors 126 and 127 are connected to the grids of the direct current amplifier valves 129 and 130. The anode circuits of these direct current amplifier valves are connected to the differential windings of the motor 122.

It is assumed that the operation of the above described arrangement for measuring distances is sufficiently clear from the description of Fig. 1. The operation of the discriminator 29, however, is set forth more in detail as follows:

The amplifier 28, represented in Fig. 3 by the valve 111, is blocked during normal function, but is momentarily unblocked when a signal enters the receiver 13 after reflection against the reflection medium, the distance of which is to be determined. At this moment the oscillator has a predetermined frequency lying between its maximum value and its minimum value, and this frequency is determined by the elapsed time from the moment when the signal was transmitted by means of the transmitter 12. By measuring this frequency one can obviously determine the time for the sound to pass through the medium and back, or in other words, one can determine the distance to the point of reflection.

The signal from the oscillator valve 80 at the frequency in question now is amplified by the valve 115, contained in the discriminator, and is fed to the output transformer, which is of a special kind for this type of discriminators. Its function is based on the following principle.

Figures 4, 5:
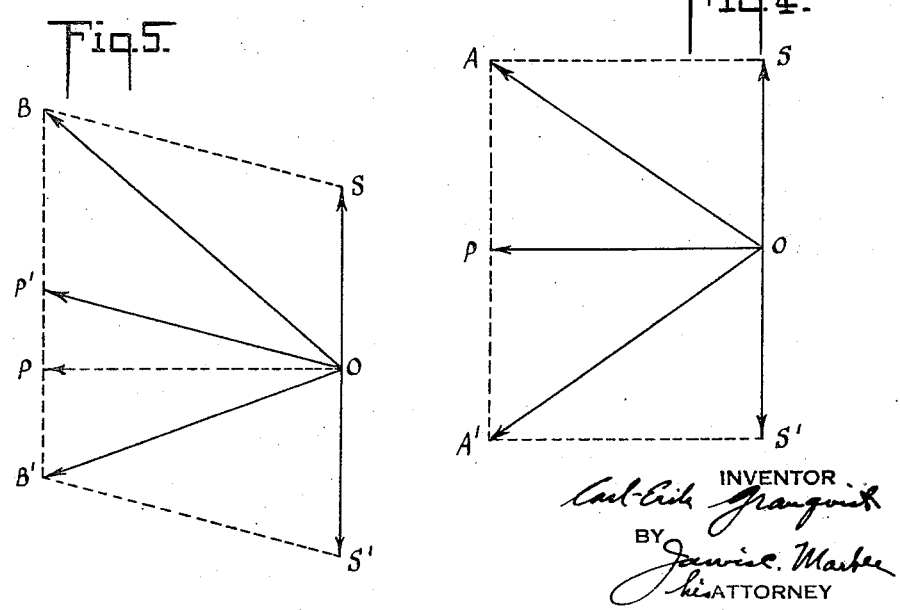
Figs. 4 and 5 are vector diagrams to be used in explaining the operation of the invention.

At exactly correct tuning the voltage OP (Fig. 4) in the primary circuit 117 and the voltage SS' in the secondary circuit 119 in the tuned transformer are mutually displaced in phase 90° as indicated by the lines SS' and OP in Fig. 4. If the voltage OP is added vectorially to the two halves OS and OS' of the voltage SS' two congruent vectors OA and OA' are obtained, which are mirror images of each other and are equal. If they are rectified two equally great direct current voltages are obtained, which, if they are opposed will give the resultant O.

If, however, the tuning should not be exactly correct, the voltage vector of the secondary winding is displaced in relation to the voltage vector of the primary winding as indicated by the vector OP' (Fig. 5), so that these vectors are no longer in 90° mutual phase position. The consequence thereof is, that one of the resultants OB obtained by the vectorial addition, will be greater, whereas the other vector OB' decreases, and consequently also the direct current voltages obtained by the rectification are of different magnitudes, so that they no longer compensate each other. A resultant direct current voltage will therefore arise, the polarity of which is determined by the direction of the error in frequency which caused the error in phase and the magnitude of which is, at least at small errors in frequency, practically proportional to the error in frequency.

The resultant voltage can therefore be used in order to reestablish the frequency balance in the system. This takes place in the form of the present invention shown in Fig. 3, by feeding the resultants of the voltages, vectorially added in the transformer 117—119, to rectifiers 131 and 132, the output direct current voltages of which are fed to grids in the direct current amplifying valves 129 and 130 as control voltages. The anode currents of these valves may therefore be approximately proportional each to one of the emanating vectorial resultants, and they are fed each to one of the windings in the differential motor 122, counteracting each other.

When a frequency error and an error in phase, cause thereby, occurs, one of the windings in the motor 122 will therefore magnetically overbalance, so that the motor is put in rotation in the direction to cause condenser 121 to shift the tuning frequency of the transformer 117—119 in a direction to balance the frequency. When frequency balance is achieved balance between the fields of both windings of the differential motor is also obtained and consequently the motor will stop. The position of the condenser, however, is on the one hand a measure of the tuning frequency of the transformer, and on the other hand it is a measure of the frequency of the oscillator 16, Fig. 1, at the moment when the amplifier 28 is unblocked, as it is this frequency which is fed to the discriminator. The instrument 15, connected to the shaft of the condenser 121, therefore will, each time a pulse is received, intermittently adjust its tuning to a position which corresponds to the time of receipt of the pulse or in other words to the distance to the level of reflection.

Of course it may happen that the distance to the level of reflection is so great that the total time of travel of a pulse from the transmitter to the reflection level and back to the receiver is longer than the time, for instance half a minute, between pulses. The instrument then may show an error corresponding to the time of movement of half a minute. In order to avoid this at exceptionally great distances the resistor 76 may be decreased to a value at which the motor 75 is moving with half the speed, one third of the speed and so on and the indications of the instrument 15 may be increased by the same factors. In a similar way at exceptionally small distances the speed of the motor may be increased, whereby the extent of movement of the instrument may be utilized to obtain a higher degree of precision.

Of course the invention is not limited to the embodiment shown and described in detail above but substantial modifications thereof may be made.

Thus it may be suitable not to give the condenser 18 such a shape that the frequency characteristic will be linear as shown in Fig. 2, but such a shape that this characteristic is logarithmic. Thereby a constant relative degree of precision is obtained over the entire measuring range. It is of course not necessary that the measured distance be registered on an instrument, but the registration may assume other forms, for instance the giving of an alarm signal when the distance decreases below a predetermined limit value and so on.

What is claimed:

1. A device for measuring distance, comprising a wave transmitter, a wave receiver responsive to waves propagated from said transmitter after reflection from the surface the distance to which is to be measured, a source of alternating current of variable frequency, means causing said frequency to vary cyclically over a predetermined band, means rendering said transmitter operative while said frequency passes through a predetermined portion of said band, a frequency responsive device connected to be responsive to the instantaneous frequency of said source and means actuated by said receiver in response to received energy to render said frequency responsive device operative, said system being so constructed and arranged that the frequency thus indicated by said frequency responsive device serves as a measure of the timing between the transmitted and received pulses.

2. A device for measuring distance as set forth in claim 1, in which the means for rendering the transmitter operative comprises a band-pass filter connected to pass said predetermined portion of said band of frequencies, and including means actuated by the energy passed by said filter for controlling the operation of said transmitter.

3. A device for measuring distance as set forth in claim 1, in which the wave transmitter includes a normally blocked amplifier and including a band-pass filter connected to pass said predetermined portion of said frequency band and means actuated in response to energy passed by said filter to unblock said amplifier.

4. A device for measuring distance as set forth in claim 1 in which frequency responsive means is arranged to render said receiver inoperative while said frequency passes through a portion of said band including said first mentioned predetermined portion, so that a reception of waves propagated directly from said transmitter is prevented.

5. A device for measuring distance as set forth in claim 1, including a band-pass filter connected to pass a predetermined portion of the band of frequencies from said source, means responsive to the energy passed by said filter to render said transmitter operative, a second band-pass filter connected to pass a wider band of frequencies than said first filter, said last band containing the first band and means responsive to energy passed by said second filter to render said receiver inoperative whereby the receiver is rendered inoperative during the periods of operation of said transmitter.

6. A device for measuring distance as set forth in claim 1, in which the frequency responsive device comprises a tuned circuit having a variable tuning element, a differential motor connected to be actuated in accordance with an unbalance produced in said tuned circuit by energy of different frequency from the frequency to which said circuit is tuned, said motor being connected to actuate said tuning element in a direction to tune said circuit to the frequency of the applied energy, indicating means actuated by said motor and means actuated in response to energy received by said wave receiver to render said frequency responsive device operative, whereby said device is caused to indicate the frequency of said source at the instant energy is received by said wave receiver.

7. A device for measuring distance as set forth in claim 1, in which amplifiers are provided in said transmitter and in said receiver, and including filter means connected to pass predetermined portions of said band of frequencies from said variable frequency source, means rectifying the energy passed by said filter means to produce direct current voltages, and means controlling the operation of said amplifiers by said last voltages.

8. A device for measuring distance as set forth in claim 1, in which amplifiers are provided in said transmitter and in said receiver, and including filter means connected to pass predetermined portions of said band of frequencies from said variable frequency source, means rectifying the energy passed by said filter means to produce direct current voltages, means connecting the transmitter amplifier to be normally blocked and means connecting the receiver amplifier to be normally operative, and means applying said voltages in a sense to unblock said transmitter amplifier and to block said receiver amplifier.

9. A device for measuring distance as set forth in claim 1, in which amplifiers are provided in said transmitter and in said receiver, and including filter means connected to pass predetermined portions of said band of frequencies from said variable frequency source, means rectifying the energy passed by said filter means to produce direct current voltages, means connecting the transmitter amplifier to be normally blocked and means connecting the receiver amplifier to be normally operative, and means applying said voltages in a sense to unblock said transmitter amplifier and to block said receiver amplifier, said voltages being applied to block said receiver amplifier over a period longer than and overlapping the period of operation of said transmitter.

10. A device for measuring distance as set forth in claim 1, in which the frequency responsive device comprises a tuned circuit having a variable tuning element, a differenttial motor connected to be actuated in accordance with an unbalance produced in said tuned circuit by energy of different frequency from the frequency to which said circuit is tuned, said motor being connected to actuate said tuning element in a direction to tune said circuit to the frequency of the applied energy, indicating means actuated by said motor and means actuated in response to energy received by said wave receiver to render said frequency responsive device operative, whereby said device is caused to indicate the frequency of said source at the instant energy is received by said wave receiver, and control means controlling the speed of operation of said differential motor so as to vary the range of indication of said frequency responsive device.

11. The device for measuring distance as set forth in claim 1, in which said frequency is caused to vary over said band as a substantially logarithmic function of time, whereby the precision of measurement is made uniform over the entire operating range.

CARL-ERIK GRANQVIST.

Certificate of Correction

Patent No. 2,371,988.　　　　　　　　　　　　　　　　　　　　March 20, 1945.

CARL-ERIK GRANQVIST

It is hereby certified that errors appear in the printed specification of the above numbered patent requiring correction as follows: Page 1, first column, line 39, after "pass" insert *type*; page 3, second column, line 27, for "cause" read *caused*; and that the said Letters Patent should be read with these corrections therein that the same may conform to the record of the case in the Patent Office.

Signed and sealed this 3rd day of September, A. D. 1946.

[SEAL]

LESLIE FRAZER,
*First Assistant Commissioner of Patents.*